Patented May 28, 1940

2,202,791

UNITED STATES PATENT OFFICE 2,202,791

REACTION OF HYDROCARBON COMPOUNDS WITH GASEOUS CHLORINE AND SULPHUR DIOXIDE

Arthur L. Fox, Woodstown, N. J., Clyde O. Henke and William H. Lockwood, Wilmington, Del., and John M. Tinker, Pennsgrove, N. J., assignors to E. I. du Pont de Nemours & Company, Wilmington, Del., a corporation of Delaware No Drawing. Application June 30, 1938,
Serial No. 216,838

17 Claims. (Cl. 260—513)

This invention relates to the preparation of chemical compounds and compositions by reacting saturated aliphatic or alicyclic compounds with a gaseous mixture of sulphur dioxide and chlorine. More particularly, it relates to the preparation of surface active compounds and compositions by reacting aforesaid hydrocarbons with a gaseous mixture of sulphur dioxide and chlorine under particular conditions and proportions and further processing the resulting products.

Methods for solubilizing hydrocarbons including saturated aliphatic hydrocarbons are described in U. S. Patent 2,046,090 and comprise reacting them with a gaseous mixture of sulpher dioxide and chlorine in the dark or in the presence of light and hydrolyzing the reaction products.

This invention has for an object the improvement of the aforesaid prior art processes. A further object is the preparation of solubilized hydrocarbons in increased yields by the aforesaid reaction. A still further object is to prevent the formation of undesirable by-products in the aforesaid general reaction. A still further object is to prepare a uniform product free from undesirable components. A still further object is the preparation of surface active compositions which are of good color and odor, and can be used as a soap or a soap substitute or in conjunction with soap or soap substitutes. Still other objects will appear hereinafter.

In carrying out the processes of the aforementioned Reed patent, it has been found that substantial amounts of sulphonyl chlorides are formed, and that these products can be hydrolyzed to form soluble products of pronounced surface activity. It has been further found that a variation of the procedural conditions of the Reed patent leads to widely differing results.

When a hydrocarbon, for example, is reacted with a mixture of sulphur dioxide and chlorine as set forth, a number of competing reactions occur. It has been found that by increasing the ratio of sulphur dioxide to chlorine that the yield of solubilized products is greatly increased. Products containing very small amounts and even no chlorine directly connected to carbon may be economically prepared according to the present process. Such products are highly desirable and may be prepared by using a material excess of sulphur dioxide to chlorine. A ratio of about 1 mol to 20 mols, preferably 2 to 6 mols of sulphur dioxide to 1 mol of chlorine has been found to be effective, and a ratio of 2.5 to 3.5 mols of sulphur dioxide to 1 mol of chlorine represents the preferred embodiment of the invention for all classes of materials treated.

Since many of the products made according to this reaction are later hydrolized and neutralized and are used as surface-active agents, it is important that they be as light colored in physical appearance as possible. It has been found that temperature has a very definite effect upon the color of the hydrolyzed and neutralized products, as well as upon the reaction itself. A proper balance of conditions and results must be made because the lower the temperature range, the slower the reaction rate. To obtain a light colored final product, it has been found that one must sacrifice the speed of the reaction. For saturated hydrocarbons and their derivatives and mixtures thereof, the temperatures should be between 30° and 80° C., and between 45° and 50° C. with saturated hydrocarbons to obtain clear products. Of course, when color is not a primary factor, any temperature that will not decompose the initial reactants and reaction products may be used. A practical range lies between 20° and 100° C.

As previously stated, the rate of the reaction is dependent in part on the temperature under which the reaction is being carried out. Another factor which has been found to have a significant effect upon the rate of reaction is the rate of flow of the mixed gases. Preferred rates of flow are from 0.33 to 1.33 parts per hour of sulphur dioxide and from 0.1 to 0.45 parts of chlorine per hour per part of charge. For white oils our preferred range is 0.66 part sulphur dioxide and 0.23 part chlorine per part of charge. The duration of the reaction varies somewhat, depending on the size of the charge, but in laboratory runs it has been found that the reaction using 1.33 parts sulphur dioxide and 0.45 part chloride per hour per part of charge runs three times as fast as when 0.33 part sulphur dioxide and 0.1 part chlorine is used.

Another important factor on which the rate of reaction has been found to be dependent is the dispersion of the mixed gases in the reaction medium. It has been found that the smaller the size of bubble, the more rapid the reaction rate. Various means of reducing the bubble size have been used and found to be effective. They include introducing the gas into the reaction mixture through a porous plate or through perforated plates. Agitation is quite effective in dispersing the larger bubbles and should be resorted to. In this connection, it has been found that the more rapid the agitation, the more effective is the utilization of the mixed gases.

Another definite problem rises in the commercial utilization of the sulphur dioxide and chlorine gases because for this reaction to be commercially feasible, one must introduce them at a very rapid rate. When these gases are used from tanks, the rapid rate of flow causes expansion and cooling in the gas cylinders with the result that the valves freeze up and uneven flow results. To overcome this difficulty, it has been discovered that if the cylinders are set at an inclined angle with the valves at the lower end, the liquid may be ejected from the tanks without causing cooling. This liquid we introduce into an expansion chamber fitted with a heating unit of some sort which vaporizes the liquids immediately, and thus gives a constant flow of gas to the apparatus. As indicated above, the ratio of the gases is quite important and, therefore, it is necessary that an accurate method be available for the proper proportioning of the two gases. Preferred methods are the use of rotometers or liquid flow-meters.

While U. S. Patent 2,046,090 indicates that light in general has a beneficial effect on this reaction, it has been found generally that the ultra-violet derived from a mercury arc or a rare gas lamp source is not as efficient as the ordinary white light. However, other wave lengths of ultra-violet may be as effective as white light. Light sources such as photo-flood lamps, ordinary clear or frosted 40–100 watt electric light bulbs or 1000–1500 watt light bulbs and carbon arcs including metal cored and metal salt cored carbon arcs, are very effective.

The reaction may be continued for an indefinite length of time. However, it has been found that the length of the reaction also has a significant effect upon the product. While the end point will vary depending upon the starting material, we have found that superior products may be obtained if the reaction is stopped at a point where the gain in weight is equal to that one would get if one sulphur dioxide molecule and two chlorine atoms were introduced into the molecule.

This method is applicable to all materials. For each material one must determine the proper specific gravity for the end point by experiment. For example, the end point may be obtained by following the specific gravity change of the reaction mass. In the case of 40 viscosity white oil, the specific gravity at the end point is about 1.1.

As mentioned above, lightness in color of the final product is highly desirable. It has been found that after a material has been subjected to this reaction, there is a very rapid progressive darkening takes place on standing. We have found that the rate of darkening may be materially diminished if the reaction mass immediately after the reaction has been discontinued, is aerated with an inert gas such as nitrogen, sulphur dioxide, carbon dioxide, etc.

The preferred mixture of gases contains an excess of sulphur dioxide to chlorine and, therefore, the exit gases from this reaction consist essentially of sulphur dioxide and hydrochloric acid with a lesser amount of chlorine present. It is of economic importance, therefore, to recover these gases. They may be mixed with a sufficient quantity of chlorine to balance up the sulphur dioxide present and passed over charcoal or some other effective catalyst to form sulphuryl chloride. These may be separated by the refrigeration method followed by a scrubbing with solvent for the sulphuryl chloride, such as chloro-sulphonic acid. Another method of utilizing the exit gases is to pass them through a second reaction mass and thus utilize all the chlorine. The exit gases from this second reactor should contain no chlorine and the $SO_2$ could be refrigerated out and recycled. The HCl gas could then be further purified and used for other purposes.

A very important factor in the successful operation of this reaction depends on the materials of construction of the reaction vessel. Materials which are not attacked by the reactants or products may be used. It has been found that materials such as stainless steel, iron, aluminum, copper and copper alloys, etc., are unsatisfactory inasmuch as ferric chloride or aluminum chloride is produced and acts as anti-catalyst in this reaction. We have found that enamel, nickel and nickel alloy vessels are satisfactory.

We have found also that a very important factor in running this reaction is the pre-treatment of the material to be reacted upon by $SO_2$ and $Cl_2$. Hydrocarbons, in general, work better if they are first purified to remove constituents containing unsaturated linkages. For example, crude petroleum distillates, although composed of aliphatic hydrocarbons, do not undergo this reaction smoothly but if they have been subjected to some appropriate pre-treatment, such as purification by treatment with sulfuric acid or the like, they are very reactive.

The invention will be further illustrated, but is not intended to be limited by the following examples:

*Example I*

A refined petroleum white oil having the following characteristics:

| | |
|---|---|
| Initial boiling point (A. S. T. M.) | 283° C. |
| Dry point (A. S. T. M.) | 324° C. |
| Saybolt Universal Viscosity 100° F. | 37.2 Secs. |
| Specific gravity 20/15.5° C. | 0.7789 |
| Refractive index 20° C. | 1.4351 | was treated in the following manner. Through 300 parts by weight of the oil was bubbled a gaseous mixture of 513 parts of sulphur dioxide and 196 parts of chlorine at a uniform rate over a period of two and three-quarters hours. The temperature of the reaction mass was kept at 45°–50° C. during the time and the reaction was accelerated by the light from an electric light bulb (100 Watt) suspended near the flask. At the end of the time the reaction mass had gained 207 parts by weight. The reaction mass was hydrolyzed by pouring into 540 parts of 30% sodium hydroxide which had previously been heated to 60° C. The heat from the hydrolysis raised the temperature to 90°–95° C. where it was kept by cooling during the duration of the reaction. The resultant crude product was alkaline to phenolphthalein. This product was then diluted with an equal weight of water and extracted with carbon tetrachloride to remove unreacted oil. After heating to remove that part of the solvent which was emulsified in the solution, the product exhibited excellent wetting, rewetting, and detergent powers.

*Example II*

A gaseous mixture of 902 parts by weight of sulphur dioxide and 297 parts by weight of chlorine were passed at a uniform rate for four hours through 200 parts by weight of menthane contained in a flask which was illuminated by a 60-watt incandescent light. Heat was evolved during the reaction. The temperature was maintained at 40° C. by means of a water bath. At the end of four hours the menthane had gained 201 parts by weight. The product formed at this stage apparently contained menthane sulphonyl chlorides, chlormenthane sulfonyl chlorides and small amount of chlormenthane. The reaction product was then added to 500 parts of 30% sodium hydroxide solution. The temperature during neutralization was maintained at 90°-95° C. About 883 parts of product were obtained. The product was diluted with 237 parts of water. An insoluble oil layer separated and was removed. The aqueous layer was filtered. This solution contained about 25% active ingredient.

The final product was soluble in 52° Tw. caustic soda solution and showed high wetting power.

Instead of a closed vessel provided with a reflux condenser, one may use a long narrow tube. The tube may be partially filled with a hydrocarbon, and chlorine and suphur dioxide may be bubbled into the bottom thereof. A counter current apparatus in which the hydrocarbon flowing in one direction through a tube is caused to react with a gaseous chlorine and sulphur dioxide mixture flowing in the opposite direction, as disclosed and claimed in Lockwood and Richmond application Serial No. 216,843 entitled Continuous process, filed upon an even date herewith, may be resorted to. The reaction vessels can be packed with any suitable device for carrying out the reaction of a liquid with a gas, e. g. Raschig rings, broken glass, etc.

The reaction zone may be maintained at atmospheric pressure or below, but is preferably carried out at atmospheric pressure or any pressure above so long as the chlorine and sulphur dioxide remain gaseous at the reaction temperature.

The hydrolysis and neutralizing products may be purified by removing the insoluble and unreacted oil by dilution and separation of the oil layer, by extraction with oil-dissolving solvents, by steam distillation to remove the unreacted oil, etc., which are disclosed and claimed in an application for Letters Patent of C. F. Reed, C. O. Henke and A. L. Fox, entitled Improved chemical process, Serial No. 216,842 filed upon an even date herewith. The aqueous solution may be dried by evaporation, spray drying, drum drying, or other conventional means. By drum drying the above product, white flaky or powdery products are obtained.

This invention is not to be limited to the hydrolysis procedure set forth in the examples. For instance, the concentration of caustic soda used for hydrolyzing the reaction product obtained by treating hydrocarbons with a gaseous mixture of sulphur dioxide and chlorine may be varied from 5% to 50%. The reaction is somewhat slower with the more dilute caustic soda solutions and almost instantaneous with the more concentrated solutions. Other alkali metal hydroxides such as potassium, caesium, etc. may be used. Likewise, the alkaline earth hydroxides and oxides may be employed. An aqueous solution of ammonium hydroxide may be used to yield the ammonium salt. Substituted ammonium salts or amine salts may be obtained by hydrolyzing the product with aqueous solutions of aliphatic, cycloaliphatic, aromatic and heterocyclic amines, such as dimethylamine, ethylamine, diethylamine and triethanolamine, piperidine, diethyl-cyclohexylamine, pyridine, aniline, toluidine, xylidines, $\beta$-naphthylamine, etc. Thus, the amine salts of the sulphonic acids may be obtained. Also, the strong quaternary ammonium bases such as tetra-methyl-ammonium-hydroxide and tetra-ethyl-ammonium-hydroxide may be used for the hydrolysis. The resulting products would be the tetra-methyl-ammonium salt or the tetra-ethyl-ammonium salt of the hydrocarbon sulphonic acid. The preferred salt for use in most treating mercerizing liquors is, of course, the sodium salt. For use in acid or salt solutions, one of the amine or quaternary ammonium salts may be more desirable as possessing greater solubility.

Water-miscible organic solvents may be used during the hydrolysis or neutralization step to promote contact between the reaction mass and the hydrolyzing agents. As examples of such solvents or diluents may be mentioned ethyl, propyl, methyl, etc. alcohols, dioxane, glycol and its ethers and esters, e. g. ethylene glycol, diethyl ether, dimethyl ether, etc.

In place of the above-described hydrocarbons or mixtures, any saturated hydrocarbon which is normally a liquid or easily liquefiable may be used. As examples of such compounds are various mineral oil fractions free from olefinic substituents, e. g. white oil, kerosene, paraffin wax, straight and branched chain saturated aliphatic hydrocarbons, e. g. normal and branched chain pentane, octane, nonane, decane, dodecane, tetradecane, pentadecane, hexadecane, octadecane, etc., cyclohexane, alkyl substituted cyclohexane, menthane, camphane, pinane, etc.

The above-described procedural conditions are not only useful in the preparation of derivatives from hydrocarbons, but may be used in almost any reaction between a liquid or liquefiable compound. Thus, it may be used with alcohols, ethers, ketones, carboxylic acids, esters, amides, sulphones, sulphonic acids, etc., which are preferably of high molecular weight, that is, contain at least eight carbon atoms. As specific examples of such compounds, mention is made of dodecyl, tetradecyl, hexadecyl, and octadecyl alcohols, diethyl-heptyl-carbinol, diethyl-tridecanol-6, tridecanone-8, heptadecanone-8, nonadecanone-9, penta-decanone-6, stearic, lauric, myristic, palmitic, decanoic, and erucic acids, methyl stearate, ethyl palmitate, methyl laurate, lard, olive oil, etc.

The preferred conditions may also be used with normally vaporous or gaseous reactants, or with any of the above-described reactants in the vapor phase.

The products produced according to this invention may be used for the same purposes as those described in aforementioned Reed, Henke and Fox application and the applications referred to therein.

As many apparently widely different embodiments of this invention may be made without departing from the spirit and scope thereof, it is to be understood that we do not limit ourselves to the specific embodiments of the invention except as set forth in the appended claims.

We claim:

1. A process which comprises reacting an organic compound containing a hydrocarbon radical of at least 8 carbon atoms with a gaseous mixture containing from 1.5 mols to 20 mols of sulphur dioxide to 1 mol of chlorine.

2. A process which comprises reacting an organic compound containing a saturated aliphatic hydrocarbon radical of at least 8 carbon atoms in the liquid state with a gaseous mixture containing from 1.5 mols to 20 mols of sulphur dioxide to 1 mol of chlorine.

3. A process as set forth in claim 1 wherein the compound is a saturated hydrocarbon.

4. A process as set forth in claim 2 wherein the compound comprises a mixture of saturated hydrocarbons.

5. A process as set forth in claim 2 wherein the gases are dispersed through the liquid medium in the form of small bubbles.

6. A process which comprises reacting a saturated hydrocarbon in the liquid state at a temperature between 20° C. and 100° C. in the presence of actinic light with a gaseous mixture containing from 1.5 to 6 mols of sulfur dioxide to one mol of chlorine, and hydrolyzing the reaction product.

7. A process which comprises reacting a saturated hydrocarbon at a temperature between 20° C. and 100° C. with a gaseous mixture containing from 1.5 mols to 6 mols of sulfur dioxide to 1 mol of chlorine, using from 0.33 to 1.33 parts of sulphur dioxide per part of hydrocarbon per hour.

8. A process which comprises reacting a saturated hydrocarbon in the liquid state at a temperature between 20° C. and 100° C. with a gaseous mixture containing from 1.5 mols to 6 mols of sulphur dioxide to 1 mol of chlorine, using from 0.33 to 1.33 parts of sulphur dioxide per part of hydrocarbon per hour.

9. A process which comprises reacting a saturated hydrocarbon in the liquid state at a temperature between 20° C. and 100° C. with a gaseous mixture containing from 2.5 mols to 3.5 mols of sulphur dioxide to 1 mol of chlorine, while illuminating the reaction zone with actinic light.

10. A process which comprises reacting a saturated hydrocarbon in the liquid state at a temperature between 20° C. and 100° C. with a gaseous mixture containing from 2.5 mols to 6 mols of sulphur dioxide to 1 mol of chlorine, and stopping the reaction when the hydrocarbon has gained in weight equal to the introduction of one molecule of sulphur dioxide and two atoms of chlorine into the molecule.

11. A process which comprises reacting a mixture of saturated hydrocarbons in the liquid state at a temperature between 20° C. and 100° C. with a gaseous mixture containing from 2.5 mols to 6 mols of sulphur dioxide to 1 mol of chlorine, and stopping the reaction when the hydrocarbon has gained in weight equal to the introduction of one molecule of sulphur dioxide and two atoms of chlorine into the molecule.

12. A process which comprises reacting a saturated hydrocarbon in the liquid state at a temperature between 20° C. and 100° C. with a gaseous mixture containing from 2.5 mols to 6 mols of sulphur dioxide to 1 mol of chlorine, stopping the reaction, and passing an inert gas through the reaction mass.

13. A process which comprises reacting a saturated hydrocarbon in the liquid state at a temperature between 20° C. and 100° C. with a gaseous mixture containing from 1.5 mols to 6 mols of sulphur dioxide to 1 mol of chlorine, and stopping the reaction when the hydrocarbon has gained in weight equal to the introduction of one mol of sulphur dioxide and two atoms of chlorine into the molecule, and hydrolyzing the reaction product.

14. A process which comprises reacting a saturated hydrocarbon in the liquid state at a temperature between 20° C. and 100° C. with a gaseous mixture containing from 1.5 mols to 6 mols of sulphur dioxide to 1 mol of chlorine, and stopping the reaction when the hydrocarbon has gained in weight equal to the introduction of one mol of sulphur dioxide and two atoms of chlorine into the molecule, and hydrolyzing and neutralizing the reaction product.

15. A process which comprises reacting a saturated hydrocarbon in the liquid state at a temperature between 20° C. and 100° C. with a gaseous mixture containing from 1.5 to 6 mols of sulphur dioxide to 1 mol of chlorine, and stopping the reaction when the hydrocarbon has gained in weight equal to the introduction of one mol of sulphur dioxide and two atoms of chlorine into the molecule, and hydrolyzing and neutralizing the product with a 25% to 50% caustic alkali solution.

16. A process which comprises reacting a saturated hydrocarbon in the liquid state at a temperature between 30° C. and 80° C. with a gaseous mixture containing from 2.5 mols to 3.5 mols of sulphur dioxide to 1 mol of chlorine, and stopping the reaction when the hydrocarbon had gained in weight equal to the introduction of one mol of sulphur dioxide and two atoms of chlorine into the molecule, and hydrolyzing and neutralizing with a caustic solution and removing the same from the unreacted constituents.

17. A process as set forth in claim 10 wherein the saturated hydrocarbon is a refined petroleum white oil.

ARTHUR L. FOX.
CLYDE O. HENKE.
WILLIAM H. LOCKWOOD.
JOHN M. TINKER.